Aug. 16, 1949.     E. A. LEMAIRE     2,479,376
FURNACE PLANT FOR CONSUMING RAW COAL DUST
Filed Sept. 1, 1945     2 Sheets-Sheet 1

Aug. 16, 1949.     E. A. LEMAIRE     2,479,376
FURNACE PLANT FOR CONSUMING RAW COAL DUST
Filed Sept. 1, 1945     2 Sheets-Sheet 2

Inventor:
Edouard Auguste Lemaire
By Williams, Bradbury & Hinkle
Attorneys

Patented Aug. 16, 1949

2,479,376

UNITED STATES PATENT OFFICE 2,479,376

FURNACE PLANT FOR CONSUMING RAW COAL DUST

Edouard Auguste Lemaire, Grenoble, France, assignor to Société Anonyme "La Mure"-Combustibles et Industrie, a corporation of France Application September 1, 1945, Serial No. 614,011
In France April 6, 1941

Section 1, Public Law 690, August 8, 1946
Patent expires September 6, 1961

4 Claims. (Cl. 110—28)

It is known that heretofore heating by solid fuels has been carried out practically by resorting to either of the two following methods, namely, an older method wherein more or less small fuel grains are burnt on hand operated grates or automatic grates or in furnaces of different types, and a more recent method wherein use is made of the spontaneous self-ignition of coal crushed into very thin dust or powder. The last-named heating method made it possible to gain advantage of coal fines or smalls which are produced in huge quantities in all collieries, provided of course that the hardships and costs which accompany the crushing and pulverizing operations are taken into account.

It is an object of the present invention to permit direct use in a special furnace plant of coal fines or smalls of a caliber or gage equal to .2 and .3 millimeter without requiring any crushing or pulverizing operation, such fines being used as they are produced in the collieries in proportion as coals are being prepared.

Another object of the invention is to provide an improved heating plant wherein there is produced by means of an auxiliary furnace in a hopper-shaped combustion chamber an ascending column of hot gases which is guided up along one face of said chamber and brought back, after striking an upper deflector, along its opposite face, so that there is generated in the combustion chamber and due to the turbulence which prevails therein a driving effect and an automatic classifying of the coal fines, the latter being transferred depending upon their volume into those thermal zones of the chamber which are most favorable to ensure their thorough combustion.

A further object of the invention is to provide a heating plant as aforesaid wherein there is no static suspension of coal grain and dust in the plant chamber through which the fluid current speed gradually diminishes, the action being rather a rapid revolution of the ignited coal particles as they are repeatedly taken and cast off several times at different levels of the plant chamber until their carbon content is exhausted by the combustion medium at high temperature and at a relatively high speed and under strong turbulence.

With these and such other objects in view as will incidentally appear hereafter, the invention comprises the novel construction and arrangement of parts that will now be described in detail with reference to the accompanying diagrammatic drawings exemplifying the same and forming a part of the present disclosure.

In the drawings—

Figure 3 is a transverse sectional view on the irregular line A—A of Fig. 2.

Figure 2:
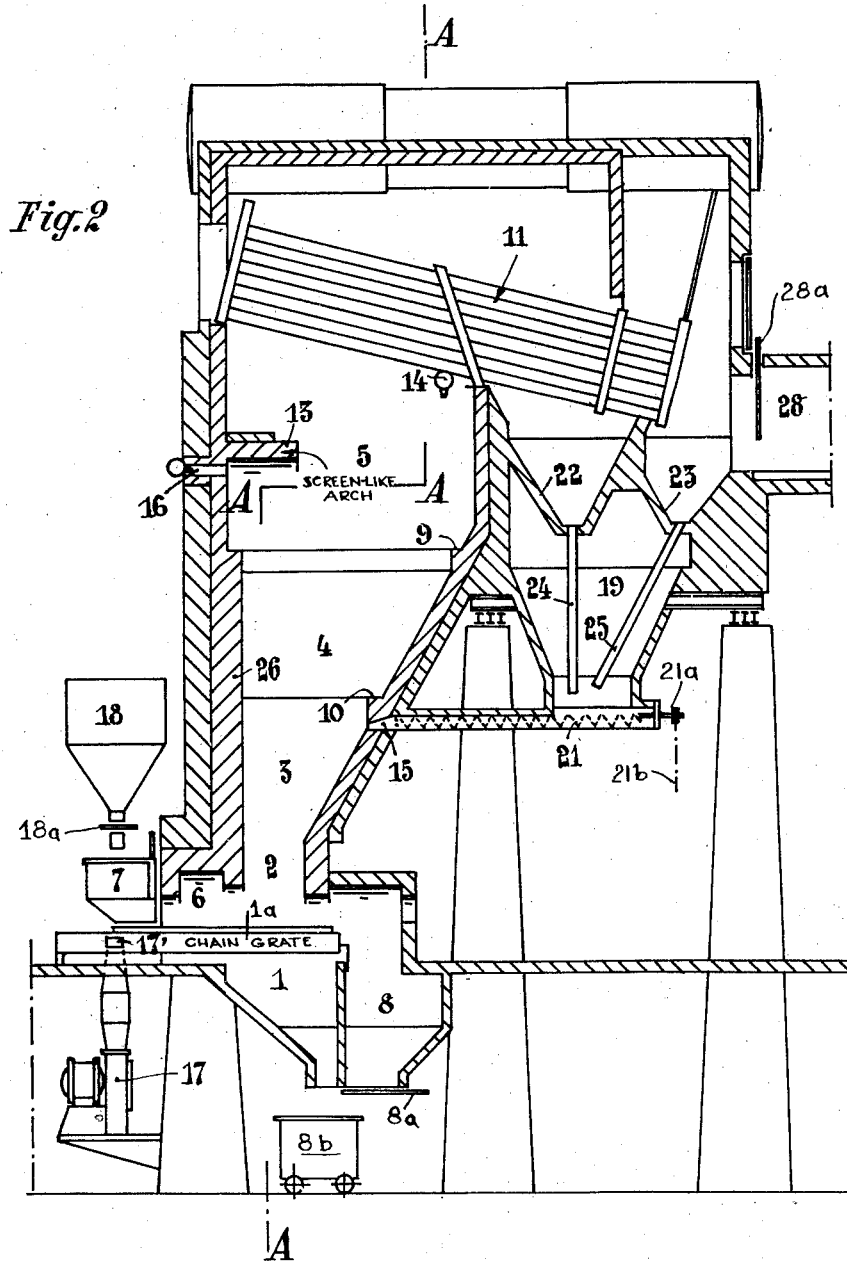
Figure 2 is a vertical sectional view showing a constructional form of such furnace plant as applied to the heating of an overhead steam generator including a tubular nest and header.

In accordance with the showing of Figs. 2 and 3, the heating plant according to the invention comprises a pilot furnace 1 the function of which is essential although its output only represents a small fraction of the contents of the receiver. The pilot furnace 1 is arranged at the lower end of the combustion chamber having its sections or compartments designated by 2, 3, 4 and 5 and provided adjacent its lower end with an ignition arch 6 over the pilot furnace 1.

Advantageously and by way of example the pilot furnace 1 is constituted by an automatic chain grate 1a of known type, said automatic grate being chiefly constituted by an endless chain to which a translational movement is imparted in the direction extending from a distributing hopper 7 to a tight ash pit 8 the lower opening of which is controllable by means of a sliding damper 8a, said pit being dischargeable for example into one of a plurality of trucks such as 8b.

The chamber compartment 2 of smaller sectional area and the chamber compartment 5 of larger sectional area of the combustion chamber have rectangular sectional areas and are interconnected by two sharp angled prismatic parts separated by horizontal shoulders or ledges 9, 10. The upper chamber section or compartment 5 terminates either under the heat receiver 11 (steam generator or oven) or sidewise if the available overall height is too small.

All the walls of the combustion chamber 2—5 are substantially vertical except its rear wall 12 whose inclination is between 20° and 40° to the vertical depending upon the arrangement of the heat receiver 11. An inwardly projecting screen-like arch 13 partly intercepts the upper chamber section 5. This arch 13 stops or deflects the vertical rising column of gas and thus protects the forward part of the tubular pile of the heat receiver 11 against the direct action of this gas.

A first adjustable secondary air inlet 14 is provided in the combustion chamber adjacent its face which forms the extension of the inclined wall of the chamber section 3. A continuous induction port for raw coal fines 15 is provided in said wall. This induction port 15 might be also arranged inside the secondary air inlet 14.

A further secondary air inlet 16 forms horizontal air jets underneath the screen-like arch 13.

A fan 17 provided with a nozzle 17' blows the major portion of the primary combustion air through the pilot furnace 1.

The plant also comprises a feeding hopper 18 containing a reserve of ignition coal and provided with a valve 18ª. It also comprises a series of raw coal fine feeding hoppers 19, 20 supplying an injection feeding worm 21 actuated by a pulley 21ª on which passes a driving belt or chain 21ᵇ.

A particular feature of the plant is to be found in the fact that most of the non-burnt portions which may be driven through the heat receiver 11 are taken back by hoppers 22, 23 and are reintroduced into the circuit through tubes 24, 25 which are imbedded in the reserve of coal fines.

The operation takes place as follows:

After firing up the pilot grate 1a, its continuous translational movement introduces into the furnace a layer of ignition coal of adjustable thickness and speed. This coal gets hotter under the action of a partial combustion under the ignition arch 6 and reaches a position just under the chamber 2. This coal then undergoes brisk combustion and strongly preheats the total quantity of air injected by the fan 17 (through the nozzle 17') and also the walls of the sections 2 and 3 of the combustion chamber.

Figure 1:
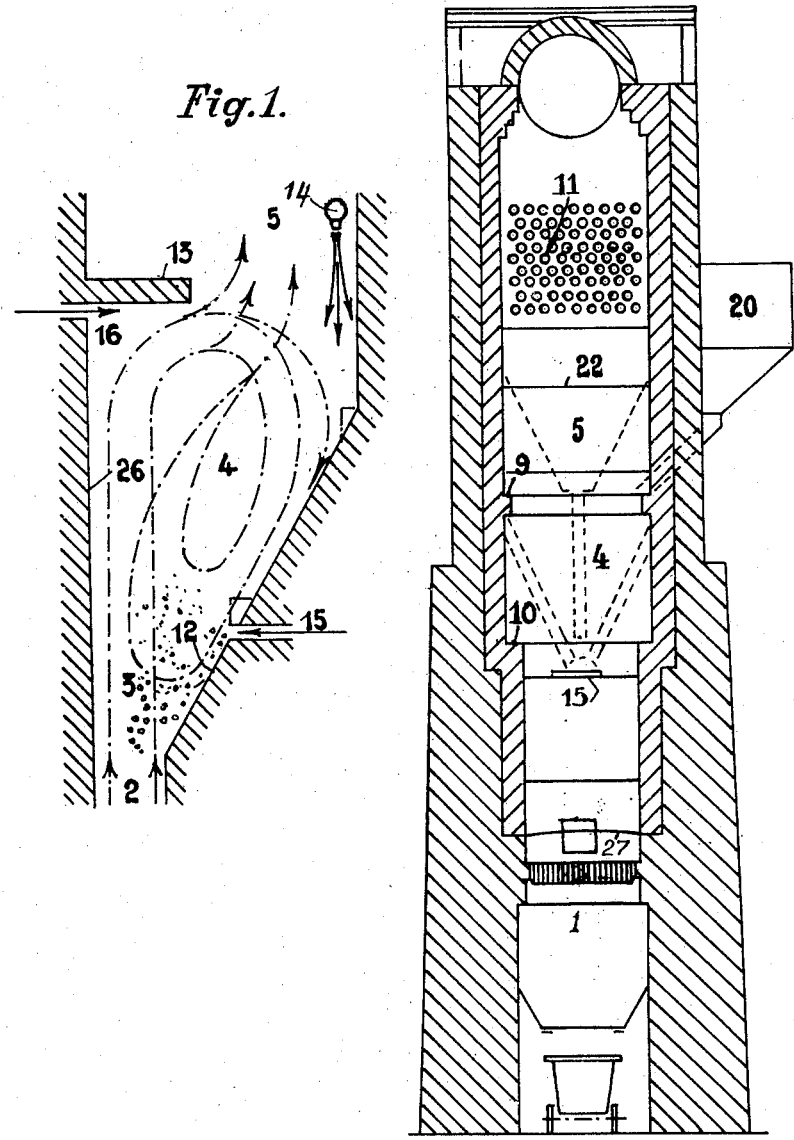
Figure 1 is a view illustrating by arrows the probable path of the hot gases through the combustion chamber of a furnace plant built according to the invention.

Gases and flames guided up through the chamber 2 constitute a high speed ascending current which follows up the vertical wall 26 and is moved off at a position corresponding with the opposite position whence the inclined wall 12 rises vertically, thereby creating, after the gaseous streams have been deflected by the deviating arch 13, a partial descending return of such gases along the inclined wall 12 (Fig. 1). This action is very useful and is automatically amplified by the lifting strength of the gaseous vein due to its average temperature being strongly raised by comparison with the ambient atmosphere adjacent the wall 26.

Raw coal fines are introduced in sheet form at 15 by the worm conveyor 21 into the fluid current as it effects its return or downward path. Such fines glide down along the wall 12 until they come into contact with the rising fluid current, whereby in the impact region an actual pneumatic sorting action takes place. The fine particles of coal forming a coal dust cloud are cast off and ignited in the chambers 4 and 5. Coal particles of average size burn in cloudy suspension in the chamber 3, while the bigger coal particles fall upon the pilot grate 1a and immediately undergo lively combustion under the action of the powerful heating effect as caused by the end of the combustion of the ignition coal.

Actually there is not, as above stated, any static suspension of grain and dust in a chamber through which the speed of the fluid current progressively dwindles down. The action is rather a rapid revolution of the ignited coal particles as they are taken and cast off several times at different levels until their carbon content is exhausted by the combustion-fostering medium, at a high temperature, and at a relatively high speed and under strong turbulence.

The secondary or additional air inlet 14 is adjusted by means of a hand-controlled valve (not shown) and by the regulatable draft through the chimney 28 whose sectional area and draft power are controllable by means of a sliding damper 28ª. Its purpose is to prevent the formation of any gaseous unburnt portion. This additional air is mixed with the ascending air current, as soon as it is created, and is afterwards heated and partakes of the pneumatic draft.

Advantageously a further secondary air inlet 16 arranged horizontally is provided underneath the screen-like arch 13 for the purpose of assisting in the deflection of the rising streams and of ensuring in the chamber compartment 5 a quicker combustion of fine glowing coal dust.

The shoulders 10 which surround the combustion chamber on three faces thereof are adapted to build up reserves or heaps of hot coal which are constantly renewed as the coal slope tumbles down under its own weight. Such reserves increase the available heat provision during variations in operating conditions of the furnace. Additional shoulders such as 9 may be also provided on the oblique walls when coal fines or smalls as commonly dealt with are liable to furnish many ashes and are hard to ignite.

However, in the case of long burning coal fines, the controls of the pilot grate 1a make it possible to strongly reduce and even to do away with the introduction of igniting coal as soon as the combustion chamber has been sufficiently pre-heated and creates such a radiation as will enable the combustible dust to be spontaneously ignited.

Whatever clinker is left by the combustion of coal particles is resolved in the combustion chamber into nuts which partake of the movement of coal fines and fall upon the grate 1a in vertical alignment with the rear arch 27 (Fig. 2) as soon as they have a sufficient size to overcome by gravitational power the lifting strength of the gaseous flux in the chamber compartment 2. Such nuts are then coalesced to the layer of coal clinker which were burned on the furnace grate 1a. All residual matters are continuously dumped into the tight ash pit 8 owing to the translational movement of the grate 1a. As most of the combustion air flows through th pilot grate 1a, the portion of fuel which is stationary upon the apron-shaped portion of this grate is burnt in a large excess of air. This constitutes a very valuable advantage since it assists in the production of clinker devoid of unburnt solid matters.

Minor constructional details particularly as regards the heat receiver might be varied to suit practical requirements without departing from the scope of the subjoined claims.

What is claimed is:

1. A furnace plant for burning raw coal fines, comprising a pilot grate of movable catenary endless structure, means including a fan and nozzle for feeding primary combustion air along said grate, means including a hopper and valve for feeding divided coal upon the upper run of said grate, an ignition arch over said grate, means forming a combustion chamber extending upwardly over the grate beyond said arch, said chamber being defined nearest to said arch by a vertical wall and on the opposite side by an oblique wall upwardly diverging from said vertical wall, said oblique wall having spaced shoulders projecting into said chamber, a deflector inwardly projecting into said chamber from its vertical wall, regulatable means for feeding coal dust into the chamber so that it may glide down in sheet form along said oblique wall, and secondary air inlet means including an air inlet in the upper part of the chamber at a level higher than that of the deflector and another air inlet just underneath said deflector.

2. A furnace plant for burning raw coal fines, comprising a pilot grate of movable catenary structure, means including a fan and nozzle for feeding primary combustion air along said grate, means including a hopper and valve for feeding divided coal upon the grate, an ignition arch over said grate, means forming a combustion chamber extending upwardly over the grate beyond said arch, said chamber being defined nearest to said arch by a vertical wall and on the opposite side in the direction of the grate motion by an oblique wall upwardly diverging from said vertical wall, said oblique wall having spaced shoulders projecting into said chamber, said chamber being divided into several superimposed sections, a horizontal arch deflector inwardly projecting into said chamber from the upper region of said vertical wall, worm feeding means for bringing a regulated quantity of coal dust through said oblique wall for it to glide down therealong in sheet form towards said grate, a heat receiver surmounting the upper section of the chamber, and secondary air inlet means including an air inlet in the upper part of the chamber adjacent the heat receiver and another air inlet through the vertical chamber wall just under the arch deflector.

3. A furnace plant for burning raw coal fines, comprising a pilot grate of movable catenary endless structure, means including a fan and nozzle for feeding primary air along said grate, means including a hopper and valve for feeding divided coal upon the grate, an ignition arch over said grate, means forming a combustion chamber extending upwardly over the grate beyond said arch, said chamber being defined by a vertical wall and by an opposite wall extending obliquely over the major portion of its length so that the sectional area of the chamber increases upwardly, said oblique wall having spaced shoulders projecting into said chamber for retaining hot coal heaps, said chamber forming four superimposed sections, a horizontal arch deflector inwardly projecting from the upper region of the vertical wall, adjustable feeding means for bringing coal dust through said oblique wall for it to glide down therealong towards the grate, a heat receiver surmounting the upper section of the chamber, a chimney communicating with said upper section, duct means leading from said upper section for bringing unburnt coal dust back to said adjustable feeding means, and secondary air inlet means including an air inlet in the upper part of the chamber and another air inlet through the vertical chamber wall just under the arch deflector.

4. A furnace plant for burning raw coal fines, comprising a pilot grate capable of effecting a translational motion, means for bringing divided coal and primary air to said grate, an ignition arch over said grate, means forming a combustion chamber extending upwardly over the grate beyond said arch, said chamber being defined by a vertical wall on one side and by an oblique wall on the opposite side so as to flare upwardly, said oblique wall having spaced shoulders for retaining hot coal heaps, an arch deflector projecting from the upper region of said vertical wall, adjustable feeding means for bringing coal dust through said oblique wall for it to glide down in sheet form therealong towards said grate, a heat receiver over the top of said chamber, a chimney communicating with the chamber top, damper means for regulating the draft through the chimney, hopper and duct means leading from the chamber top for bringing down unburnt coal dust back to said adjustable feeding means, and secondary air inlet means including an air inlet in the upper part of the chamber and another air inlet through the vertical wall just under the arch deflector.

EDOUARD AUGUSTE LEMAIRE.

REFERENCES CITED

The following references are of record in the file of this patent:

UNITED STATES PATENTS

| Number | Name | Date |
|---|---|---|
| 1,450,154 | Kupa | Mar. 27, 1923 |
| 1,452,045 | Hawley | Apr. 17, 1923 |
| 1,630,387 | Jacobus | May 31, 1927 |
| 1,661,408 | Chapman | Mar. 6, 1928 |
| 1,714,678 | Kreisinger | May 28, 1929 |
| 1,719,874 | Chapman | July 9, 1929 |
| 1,790,750 | Jacobus | Feb. 3, 1931 |
| 1,849,095 | Keenan, Jr. | Mar. 15, 1932 |
| 1,898,479 | Coghlan et al. | Feb. 21, 1933 |
| 1,918,401 | Kleinow | July 18, 1933 |
| 1,942,687 | Daniels | Jan. 9, 1934 |
| 1,947,460 | Coutant | Feb. 20, 1934 |
| 1,970,109 | Stratton | Aug. 14, 1934 |
| 2,072,450 | Hobson, Jr. | Mar. 2, 1937 |
| 2,110,452 | Moyer | Mar. 8, 1938 |
| 2,386,336 | Mosshart | Oct. 9, 1945 |

FOREIGN PATENTS

| Number | Country | Date |
|---|---|---|
| 552,436 | France | Jan. 22, 1923 |